(12) United States Patent
Kark

(10) Patent No.: US 7,422,424 B2
(45) Date of Patent: Sep. 9, 2008

(54) DEVICE AND METHOD FOR SHAPING A FOIL STRIP

(75) Inventor: Uwe Kark, Hamburg (DE)

(73) Assignee: Kark AG, Hamburg (DE)

( * ) Notice: Subject to any disclaimer, the term of this patent is extended or adjusted under 35 U.S.C. 154(b) by 96 days.

(21) Appl. No.: 10/587,793

(22) PCT Filed: Apr. 18, 2004

(86) PCT No.: PCT/EP2004/004145

§ 371 (c)(1),
(2), (4) Date: Jul. 31, 2006

(87) PCT Pub. No.: WO2005/072929

PCT Pub. Date: Aug. 11, 2005

(65) Prior Publication Data

US 2007/0104817 A1 May 10, 2007

(30) Foreign Application Priority Data

Jan. 30, 2004 (EP) ................... 04002152

(51) Int. Cl.
*B29C 43/46* (2006.01)
(52) U.S. Cl. ............... 425/224; 425/363; 425/373; 425/446; 425/471; 165/89; 492/46
(58) Field of Classification Search ......... 425/471, 425/224, 363, 373, 445, 446; 492/16, 46; 165/65, 89
See application file for complete search history.

(56) References Cited

U.S. PATENT DOCUMENTS

| 2,526,318 | A | * | 10/1950 | Battin .......................... 165/65 |
| 4,447,940 | A | * | 5/1984 | Appenzeller et al. ........... 492/7 |
| 4,679,287 | A | * | 7/1987 | Allard .......................... 492/46 |
| 4,683,628 | A | * | 8/1987 | Schonemann ................. 492/46 |
| 5,945,042 | A | | 8/1999 | Mimura et al. |
| 6,056,039 | A | * | 5/2000 | Morel et al. ................... 492/46 |
| 6,221,301 | B1 | | 4/2001 | Tsunashima et al. |
| 6,683,284 | B2 | * | 1/2004 | Nyman et al. .................. 492/46 |

FOREIGN PATENT DOCUMENTS

| DE | 41 10 248 A1 | 10/1992 |
| DE | 199 00 381 A1 | 7/2000 |
| DE | 199 43 604 A1 | 3/2001 |
| JP | 6-87150 | * 3/1994 |

* cited by examiner

*Primary Examiner*—James Mackey
(74) *Attorney, Agent, or Firm*—Alix, Yale & Ristas, LLP

(57) ABSTRACT

Apparatus for the forming of a strip, formable at increased temperature, in particular of a strip consisting of thermoplastic, in a continuous run on the surface of a rotating drum which is to be heated and/or to be cooled in predetermined stationary regions. In order to reduce the energy losses due to the heating and cooling alternation, the thin-walled drum is mounted on a carrier body which can be heated or cooled in the respective regions and is heat-exchangeable with the drum surface at least in these regions.

20 Claims, 6 Drawing Sheets

DEVICE AND METHOD FOR SHAPING A FOIL STRIP

BACKGROUND

The invention relates to an apparatus for the forming of a strip in a continuous run on the surface of a rotating drum which is to be heated and/or to be cooled in predetermined stationary regions. The field of use is mainly the forming of plastic films or plastic sheets which are to have special optical properties due to their surface form, for example as Fresnel lenses. Another field of use is the three-dimensional patterning of wallpapers or textile materials with or without the participation of thermoplastics. The strip to be formed is brought, in the heated zone, into intimate contact with the drum surface such that it complementarily assumes the form of the latter. For example, a plastic extrusion delivered in the hot-plastic state from an extruder nozzle onto the surface of the drum is pressed by a calendar roller against the drum and fills the form depressions provided there. The strip solidifies in the following cooling zone, so that it can finally be removed in the dimensionally stable state from the drum.

In a known apparatus of this type (DE-A 19900381), that region of the drum onto which the plastic melt impinges is heated in order to prevent a premature solidification of the plastic. This is to ensure that the plastic is sufficiently flowable so that even fine form depressions of the drum surface can be filled completely. The heated region of the drum in which the plastic is delivered is followed by a cooling region in which the plastic located on the drum is cooled by cooling air from the side facing away from the drum. After its solidification, it is drawn off in strip form from the drum. Cooling from the outside has the disadvantage that it is difficult to achieve the reliable solidification also of the fine plastic structures present on the inside of the drum, although this is especially important.

It is also known (DE-A-4110248; DE-C-19943604) to cool the drum from inside while the drum surface is being heated by external heating means before the delivery region is reached. The alternating heating and cooling entail a high energy loss, because it must be presupposed that, for reasons of rigidity, the drum is thick and has a correspondingly high heat capacity. This applies all the more when the drum is heated and cooled solely from inside (U.S. Pat. No. 5,945,042, FIG. 3).

It is known, furthermore, to use an endless belt instead of a drum in order to form the plastic strip (U.S. Pat. No. 5,945,042, FIG. 1). However, deep and exact engravings, such as are required, for example, for the production of optically effective plastic moldings, cannot be joined with sufficient dimensional stability and flexural fatigue strength in endless belts.

An object is to provide an apparatus for the forming of a strip, formable at increased temperatures, in a continuous run on the surface of a rotating drum which is to be heated and/or cooled in predetermined stationary regions, in which the heat losses are reduced in spite of the use of a cylindrical drum.

SUMMARY

Accordingly, there is provision for the drum, at least in those regions in which it is to be heated or cooled, to be mounted heat-exchangeably on a carrier body which is provided in the respective regions with heating or cooling devices. The drum, by virtue of its support on the carrier body, can have a thin-walled design with low heat capacity. In heat-exchangeable contact with the carrier body, it quickly assumes its surface temperature. Since, due to its low heat capacity, only a small heat quantity needs to be exchanged during the change in temperature, energy loss is low.

The drum may slide directly on the surface of the carrier body. If the latter has a sufficiently low coefficient of friction, such as is the case with a suitable choice of material (for example, graphite), there is no need for a lubricant between the drum and the carrier body. However, the use of a liquid intermediate layer is expedient, specifically not only to lower the friction, in the case of any desired material pairing, but also as a heat exchange medium. The liquid may be supplied at a pressure which is higher than atmospheric pressure, in order to exert a supporting action on the drum and be distributed uniformly such that solid-to-solid contact is essentially avoided. In general, for a uniform support of the drum and for a uniform heat transmission, it is expedient if those surfaces of the drum and of the carrier body which are opposite one another are smooth. That is to say, no coarse depressions and elevations are present. However, small roughnesses distributed uniformly in statistical terms or arranged regularly may be advantageous. They are small within the meaning of the invention when at least one dimension of the depressions forming the roughness remains essentially below 0.5 mm. Whether larger roughnesses can be tolerated depends on their influence, if appropriate to be ascertained by testing, on the desired uniformity of the support and of the heat transmission.

It is also within the scope of the invention, however, if devices for the hydrostatic and/or hydrodynamic mounting of the drum are provided in a thought-out manner. For this purpose, the surface of the carrier body has provided on it, expediently so as to alternate in a circumferential direction, and lying in a cylinder surface, raised surface portions and recessed surface portions in which a pressure suitable for sufficient support of the drum can be built up. The devices for feeding the liquid expediently issue in these recessed surface portions. The raised and recessed surface portions are expediently uniformly formed continuously from one edge to the other within the working width of the apparatus, so that the pressure and temperature conditions are constant over the entire width of the strip to be processed.

Various possibilities for heating or cooling the carrier body are available in the prior art, for example the use of a heat transfer liquid which is circulated through the respective regions of the carrier body and heat exchanger. For this purpose, the carrier body may contain, in its regions to be heated or cooled, heat exchange surfaces in which are expediently groups of axially parallel bores through which the heat transfer liquid flows. Heating may also take place by electrical means, for example electrical resistance or induction heating elements.

The liquid layer between the sliding surfaces may be separated completely from the circulation of the heat transfer liquid. The advantage of this is the liquids and also their pressures and temperatures can be optimally selected independently of each other according to their respective function. However, if appropriate, a simplification of the design can be achieved if the bearing liquid is derived from the circulation of the heat transfer liquid. For this purpose, flow connections may be provided between the heat exchange surfaces lying inside the carrier body and the surface of the latter. Not the entire liquid supplied to the carrier body for heating or cooling also subsequently has to heat the interspace between the drum and the carrier body. On the contrary, a small fraction of this is sufficient, as a rule, for the hydrostatic mounting or lubrication of the drum.

The hydrostatic pressure of the lubricating liquid does not need to be constant over the circumference of the drum or of the carrier body. On the contrary, a separate and regulated liquid supply can ensure that the pressure is higher in those zones in which a particularly high supporting action is desired than in other zones. In particular, the pressure in those zones in which the liquid or plastic material is distributed between the surface of the drum and a calibrating countersurface may be set higher than in the zones which follow in rotation.

The drum, which is sensitive because of being thin-walled, requires additional support at its edge. For this purpose, end-face holding rings are provided which are firmly connected to it. They have an extension surface fitting into the inside diameter of the drum and an abutment collar against which the end face of the drum can be tensioned axially by means of a plurality of tension fingers distributed over the circumference. By virtue of this arrangement, the tension forces remain restricted to the edge region of the drum. No disturbing forces are to be expected in the radial direction or circumferential direction. Owing to the support by the holding rings, there is just as little an occurrence of distortions transversely on the width of the drum.

The carrier body is expediently formed by a hollow cylinder or segments of a hollow cylinder which is or are tensioned axially between two flange plates or held in any other suitable way. The design of these parts as bodies of revolution or as parts of a body of revolution allows accurate manufacture and assembly.

If designing the carrier body as a unitary hollow cylinder held rigidly by the flanges presents problems in terms of the expected thermal expansions, it is more expedient to use hollow-cylinder segments. Their edges contiguous to one another are to be connected to one another such that the formation of a step in the carrier body surface at the transition from one segment to the other is avoided. This is best achieved by means of an articulated connection of the two edges. What is suitable for this purpose is, in particular, a joint which connects the two edges to one another in the manner of a piano hinge. However, a groove-and-tongue joint may also be sufficient. The two segments may even be connected to one another in one piece if they adjoin one another in the connection region in a highly flexible manner (with respect to an axially parallel flexion axis), for example by means of an axially parallel indentation.

The connection of the segments to the flanges is to take place in such a way that thermal expansions of the heated region with respect to the flanges are possible in the circumferential direction. In the cooling region, this is less absolutely necessary, but it is also advantageous. In any event, a sufficient radial support of the segments by the flanges must be provided.

The liquids used in the sliding gap in the heating region and in the cooling region are expediently materially identical, so that they do not have to be separated from one another in an absolutely leaktight manner.

The invention is explained in more detail below with reference to the drawing which illustrates an advantageous exemplary embodiment and in which:

DETAILED DESCRIPTION OF THE PREFERRED EMBODIMENTS

Figure 1:
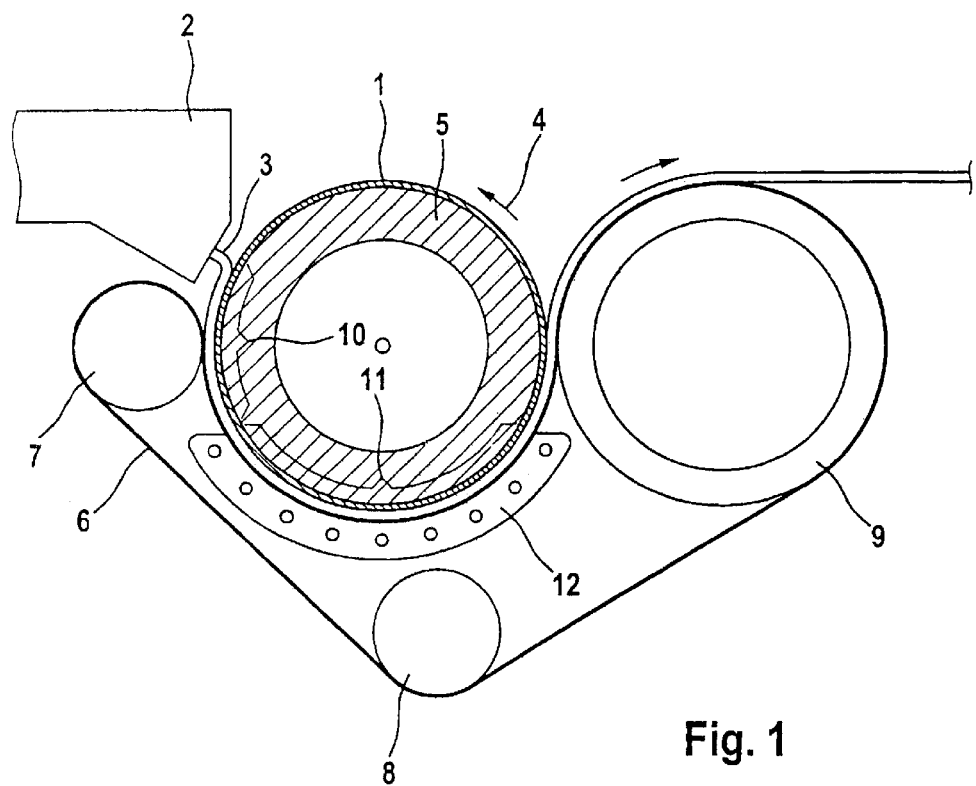
FIG. 1 shows an overall diagrammatic view of the plant.

A drum 1 for the forming of an extrusion 3 of a hot-plastic thermoplastic, said extrusion emerging from an extruder nozzle 2, is arranged rotatably in the direction of the arrow 4 on a stationary carrier body 5. Over a part of the circumference of the drum 1, a steel belt 6 is tensioned, which runs via the rollers 7, 8 and 9 and with the surface of the drum 1 encloses a gap in which the plastic extrusion 3 to be formed is located, in order to be pressed against the drum surface. The roller 7 acts via the steel belt as a calendar which determines the thickness of the plastic strip. In that region in which the plastic extrusion 3 is delivered to the drum surface and is pressed against the drum surface by the roller 7, the drum 1 is heated to at least the melting temperature of the plastic. If the plastic used is PMMA, the surface temperature is, for example, to amount to at least 180° C. and preferably be of the order of magnitude of 220° C. In a circumferential arc following the roller 7, the temperature may, if necessary, continue to be kept so high that the plastic has sufficient time and flowability until the form depressions located on the drum surface are filled completely. The region 10 in which the drum is to be at an increased temperature is designated below as the heating region.

This is followed by the cooling region 11 in which the drum 1 is cooled so that the plastic extrusion 3 has at the end of this region a temperature below the glass transition temperature. If desired, the plastic extrusion may also be cooled in the cooling region from the outside by means of a device 12. After the cooling region 11, the plastic extrusion is lifted off from the drum 1 and is discharged for further processing. The plant may thus far be considered to be known.

Figure 2:
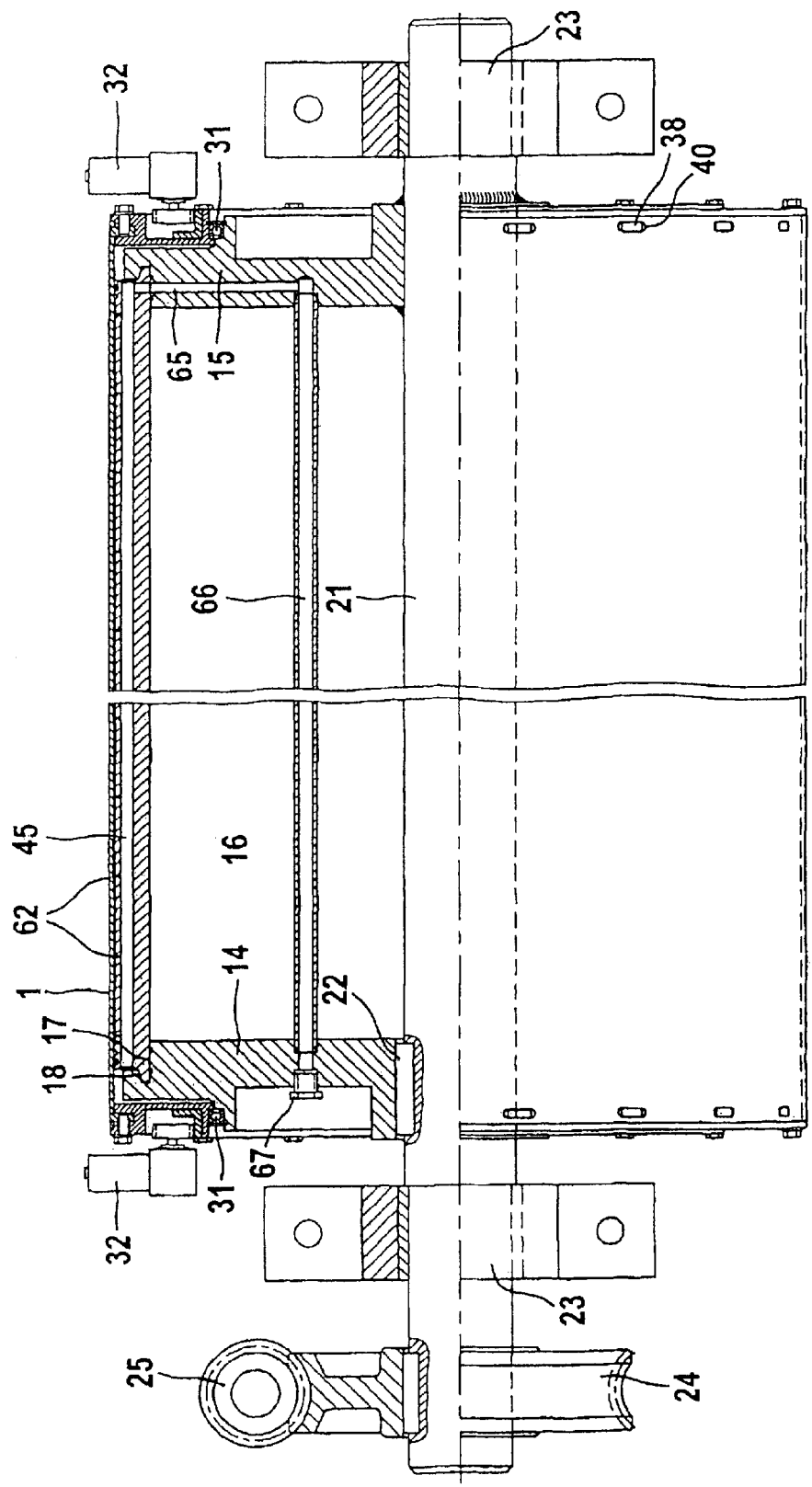
FIG. 2 shows an axial section through the apparatus.
Figure 3:
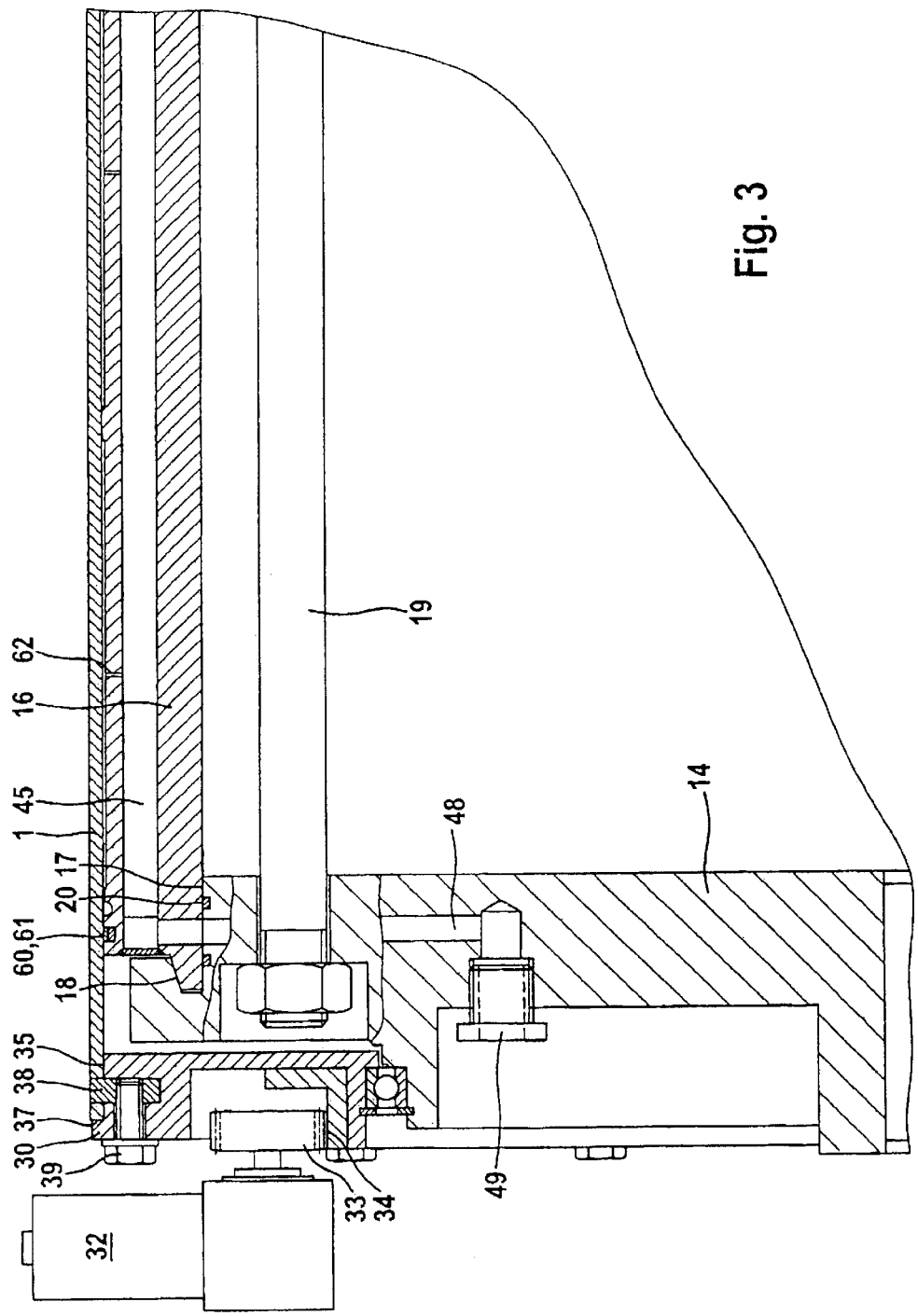
FIG. 3 shows a partial axial section, corresponding to FIG. 2, on a larger scale.
Figure 4:
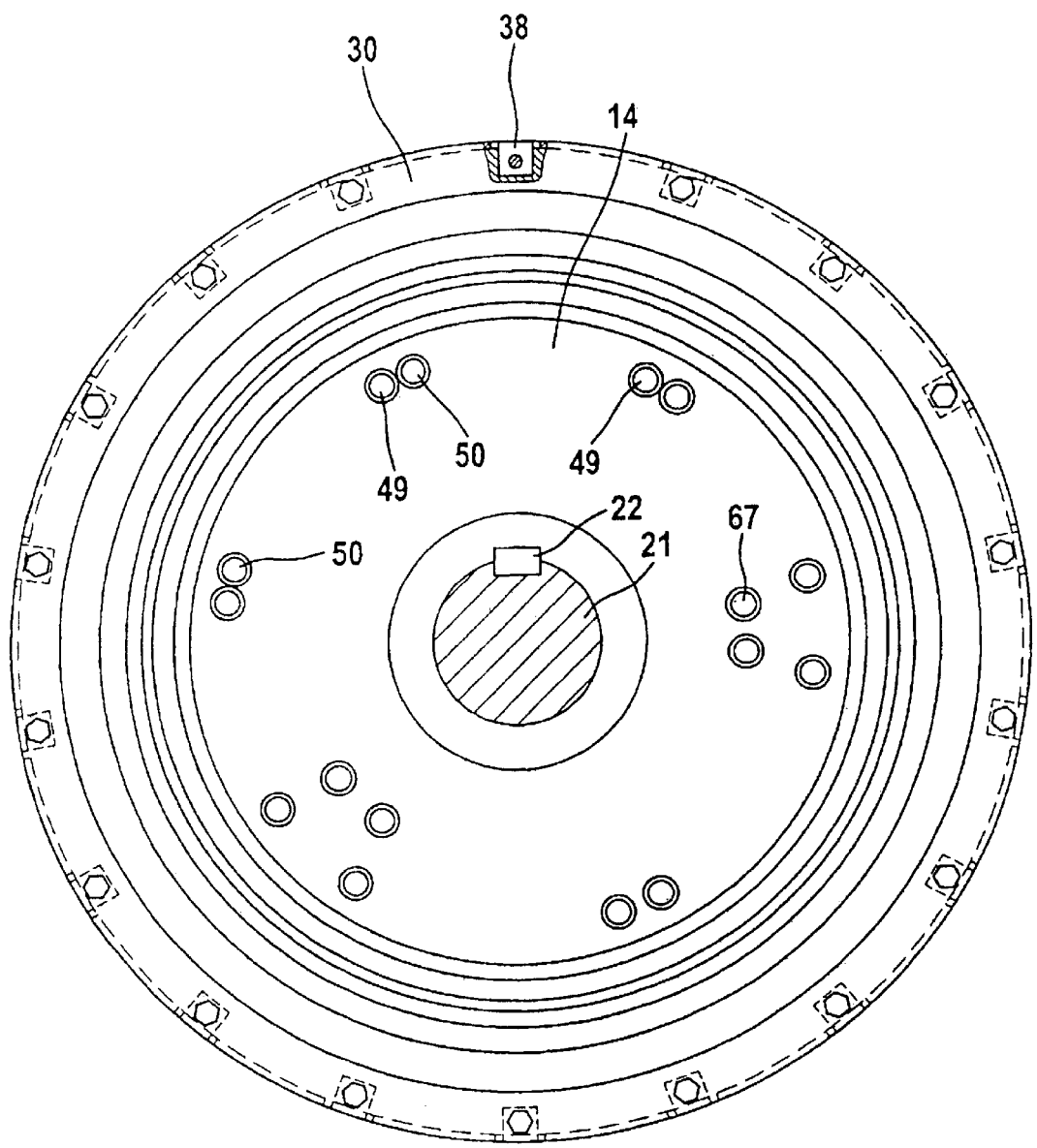
FIG. 4 shows an end view.

As can be seen in FIGS. 2 and 3, the drum 1 is very thin in comparison with its diameter. Its thickness lies between 2 and 10, preferably between 3 and 5 mm. Its diameter is, as a rule, larger than a hundred times its thickness, for example, 800 mm.

The drum consists of a material which, at the prevailing temperatures, has sufficient dimensional stability and can be provided with the desired form depressions. It consists, for example, of copper and may be built up or subsequently engraved on a complementary master form by the electroplating method. This is known.

The drum 1 is mounted slidingly rotatably on the carrier body 5 which, in the example illustrated, forms an essentially cylindrical surface extending continuously over 360 degrees. The drum 1 is thereby supported over its entire circumference. However, there is also the possibility of restricting the support to those circumferential regions of the drum 1 in which the drum is exposed to radially acting forces. The drum 1 is seated on the surface of the hollow cylinder 16 with a sliding or running seat which allows sufficient freedom from friction when oil is supplied under pressure into the sliding gap. The oil pressed into the sliding gap lowers the friction and ensures an undisturbed heat flow. If there is the risk that the sliding mounting is not adequate for a sufficiently low-friction and low-wear support of the drum 1 with respect to the calendar roller 7, that is to say in the region in which it is subjected to the highest load, an additional support may be provided by a supporting roller embedded in the surface of the carrier body.

In the example illustrated in FIGS. 2 and 3, the carrier body consists of two flanges 14, 15 and of a hollow-cylindrical part 16 which may be designed as a hollow cylinder extending over the entire circumference or as a group of cylinder segments. The flanges 14, 15 form cylindrical extension surfaces 17 for the fitting reception of the inner edge of the hollow cylinder 16 or of the segments. Furthermore, the edge of the hollow-cylindrical part 16 and the flanges cooperate via a conical surface 18 which ensures play-free mutual centering when the flanges 14, 15 are pulled together axially by means of tension screws 19 distributed over the circumference. This applies even when the hollow-cylindrical part 16 is formed by a plurality of several segments. This may be expedient when successive segments are to be separated thermally from one another. Thus, for example, it is possible to use separate segments for the heating region and the cooling region. A heat insulation located, if appropriate, between these regions may be designed as a separate segment.

During operation, the carrier body is connected in a stationary manner to a holding frame, not illustrated. In the exemplary embodiment, however, said carrier body is angularly adjustable about its axis, so that its heating and cooling regions can be set optimally in relation to that location at which the hot-plastic extrusion 3 is supplied and calendared. For this purpose, the flanges 14, 15 are carried by a shaft 21 to which one of the flanges 15 is connected rigidly, while the other flange 14 is axially displaceable thereon in terms of the necessary thermal expansion, but, by virtue of a feather key arrangement 22, is fixed in terms of rotation. The shaft rests in bearings 23. Its rotary position is determined by a suitable setting device which, in the example of FIG. 2, is formed by a worm wheel 24 and a worm 25.

To strengthen the thin-walled drum, it is connected at the edges to rings 30 which, if desired, may be supported on the flanges 14, 15 on the carrier body 5 via bearings 31. The bearings are designed such that thermal expansions cannot lead to a distortion of the drum. If a rotary drive 32 is provided for the drum, this acts via a gearwheel 33 and toothed rim 34 on at least one of these rings, but preferably uniformly on both rings 30, in order to keep the forces acting on the thin-walled drum low and symmetrical. In many instances, a rotary drive for the drum is unnecessary if the steel belt 6 is driven. This applies particularly when the drum is taken up positively by the driven steel belt 6 due to cooperating teeth and tooth perforation in a similar way to a photographic film and a film sprocket roller. However, the friction exerted via the solidifying strip is also sometimes sufficient for the take-up.

The rings 30 have a cylindrical extension surface 35 which fits with the inside diameter of the drum 1 and which is limited on the outside by an abutment collar 37. The drum end face, likewise designated by the reference numeral 37, is tensioned against the abutment collar by means of fingers 38 and screws 39. For this purpose, the fingers 38 engage in orifices 40 in the drum 1 which are distributed at uniform intervals over the circumference of the drum along the two edges of the latter. The orifices are larger than the fingers 38 in the circumferential direction, so that undesirable circumferential tensions cannot be exerted on the drum by the fingers 38 in the case of production and assembly tolerances.

The heat energy may be supplied to the heating region in various ways, for example by means of electrical resistance heating bodies, gas burners or inductive heating. In the example in FIGS. 2 to 6, the energy supply is provided by means of a heat transfer liquid, in particular oil. The heating region contains one or more groups of axially parallel bores 45 which are alternately connected in pairs at their ends by means of milled-out pockets 46 which are closed by means of lids 47. This results in a closed flow path from a first bore 45' to a last bore 45".

If a plurality of such bore groups are present, separate heating segments may be provided in each case for this purpose or a plurality of groups are contained within a continuous heating segment.

Figure 5:
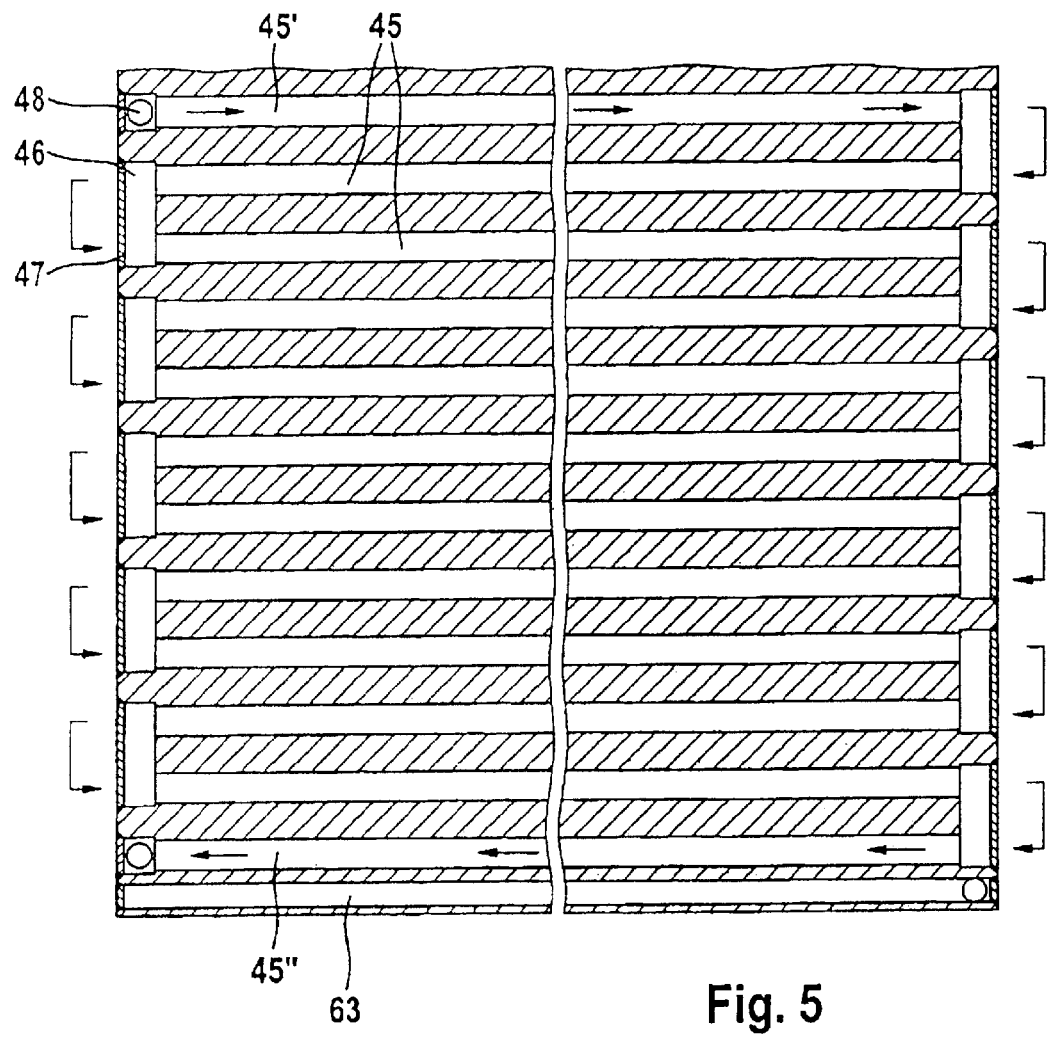
FIG. 5 shows a surface-parallel partial section through the drum.

As shown in FIGS. 3 and 5, a first bore 45' of a group is fed from a forward-flow connection 49 via a radial forward-flow bore 48 which is sealed off by means of a sealing ring 20 at the transition from the hollow-cylinder part 16 to the flange 14. The last bore 45" of the group is connected in the same way to a return-flow connection via a return-flow bore.

The heating liquid is supplied to the forward-flow connection 49 in the usual way, not shown, from a liquid reservoir via a pump and a heat exchanger and passes from the return-flow connection back into the reservoir. To set the pressure acting in the system, a preferably adjustable throttle may be provided in the return flow. The cooling region may be designed in the same way.

To lower the friction between the drum 1 and the surface of the carrier body 5, the drum mounting is designed hydrostatically in the exemplary embodiment. This means that the lubricating liquid in the sliding gap is kept under a pressure which is at least as high as the pressure required for the preferably contactless support of the drum. This pressure is highest in that region in which the hot-plastic extrusion 3 is reduced to the desired thickness between the drum surface and the surface of the roller 7. Between the rollers 7 and 9, the pressure corresponds essentially to the pressure which is exerted on the hot-plastic extrusion by the tension of the steel belt. The bearing pressure is lowest in the free drum region between the roller 9 and the extruder nozzle 2. It may therefore be expedient to divide the sliding gap between the drum 1 and the surface of the carrier body 5 into separate zones acted upon with a different bearing pressure. These zones are sealed off with respect to one another and to the atmosphere. Special sealing strips may be provided for this purpose. According to FIG. 6, such a sealing strip 61 arranged in a groove and consisting of material having favorable sliding properties, for example PTFE, is pressed against the inner face of the drum 1 by an elastomeric ring 60. Such sealing devices may be provided both on the circumference and transversely thereto. While substantial leaktightness is desired on the circumference, the transverse seals located between the successive zones need merely to generate a throttling action of such a level that the desired pressure difference between these zones is ensured.

The supply of liquid to the sliding gap may take place independently of the heating medium. However, according to the invention, an appreciable simplification of the design is achieved in that the liquid supply is derived from the heating medium. It can be seen in FIG. 3 that connecting bores 62 are provided between a bore 45 of the heating or cooling system and the surface of the carrier body. Part of the oil circulating as heating or cooling medium passes through these bores into the sliding gap and serves there as lubricant and hydrostatic pressure medium. In order to discharge it again, for each pressure zone of the sliding gap, a discharge bore 63 (FIG. 6) is provided, which is connected to the sliding gap via a bore 64 and from which the oil passes via a radial bore 65 in the flange 15 and a connecting tube 66 to a connection 67.

The surface of the carrier body may be continuously smooth. If, however, for the purpose of the hydrostatic mounting of the drum, recessed surface portions 70 and raised surface portions in the form of ledges 72 are provided alternately in the surface of the carrier body, the ledges 72, by their running play with respect to the inner face of the drum 1, determine the position of the latter. The recessed surface portions 70 allow an uninhibited pressure propagation in the hydrostatic liquid.

The pressure in the sliding gap and, in particular, in the recessed surface portions 70 acted upon by hydrostatic pressure, is determined essentially by the flow resistance which the liquid meets in its outflow path. This flow resistance may be set by the provision of a throttle in the outflow path. If the pressures in various pressure zones are different, these zones may be assigned correspondingly different set or adjustable throttles.

Figure 6:
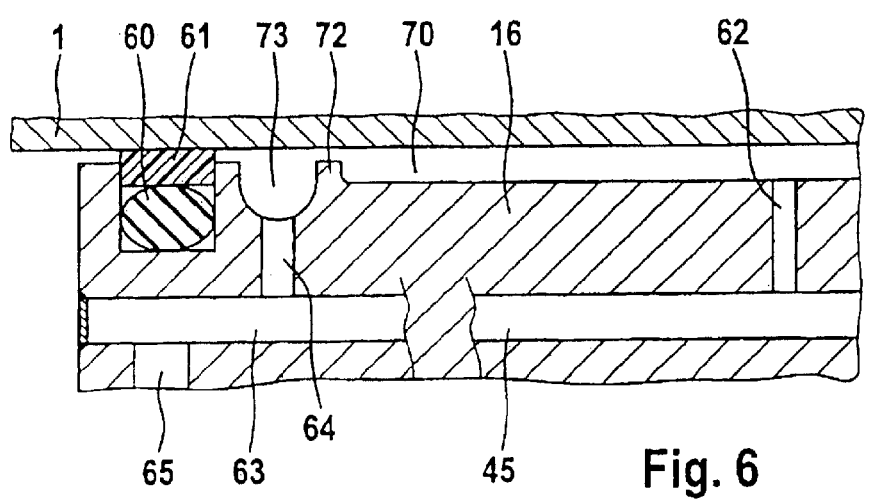
FIG. 6 shows a partial axial section through the drum and the carrier body.

FIG. 6 shows a simpler arrangement of the exemplary embodiment. Liquid discharge takes place at the edge of each pressure zone. Within the sealing strip 61 which delimits the zone, a collecting channel 73 is provided, which is connected to the discharge line 63 via the bores 64. Between the recessed surface portion 70 acted upon by pressure and the collecting channel 73, a raised ledge 72 is arranged. The ledge forms, with the inner face of the drum 1, a narrow gap by means of which the pressure of the oil flowing out of the region 70 is throttled in a largely self-regulating manner. When the pressure transmitted via the drum is higher than the pressure in the bearing gap, the drum approaches the carrier body, with the result that the gap becomes narrower. As a result, the outflow is inhibited while the pressure in the bearing gap grows until it is equal to the pressure transmitted by the drum. It is presupposed in this case that the oil supply is capable of generating a pressure of sufficient magnitude. The ledge 72 thereby forms with the inner face of the drum a self-regulating throttle arrangement.

The oil may be drawn off from the collecting channel 73 by means of a pump. The advantage of this is that the pressure prevailing in the collecting channel 73 and acting on the sealing arrangement 60, 61 is reduced and the leaktightness requirement to be satisfied by the sealing arrangement is lowered.

The delimitation of zones of different pressure which succeed one another in the circumferential direction may take place by means of an arrangement such as is illustrated in FIG. 6. Each zone is then surrounded by a throttle ledge 72 and a collecting channel 73 discharging the oil. Each zone may then also be assigned a sealing arrangement 60, 61, or only one such sealing arrangement is provided between the adjacent zones. In this case, the arrangement may be such that oil is caused to flow out from the zone of higher pressure to the zone of lower pressure.

A separate liquid supply to the zones makes it possible to act upon them with different pressure. They may also be thermally controlled differently. For this purpose, each zone or each surface portion may be assigned in each case a separate group of heat exchange bores 45.

Figure 7:
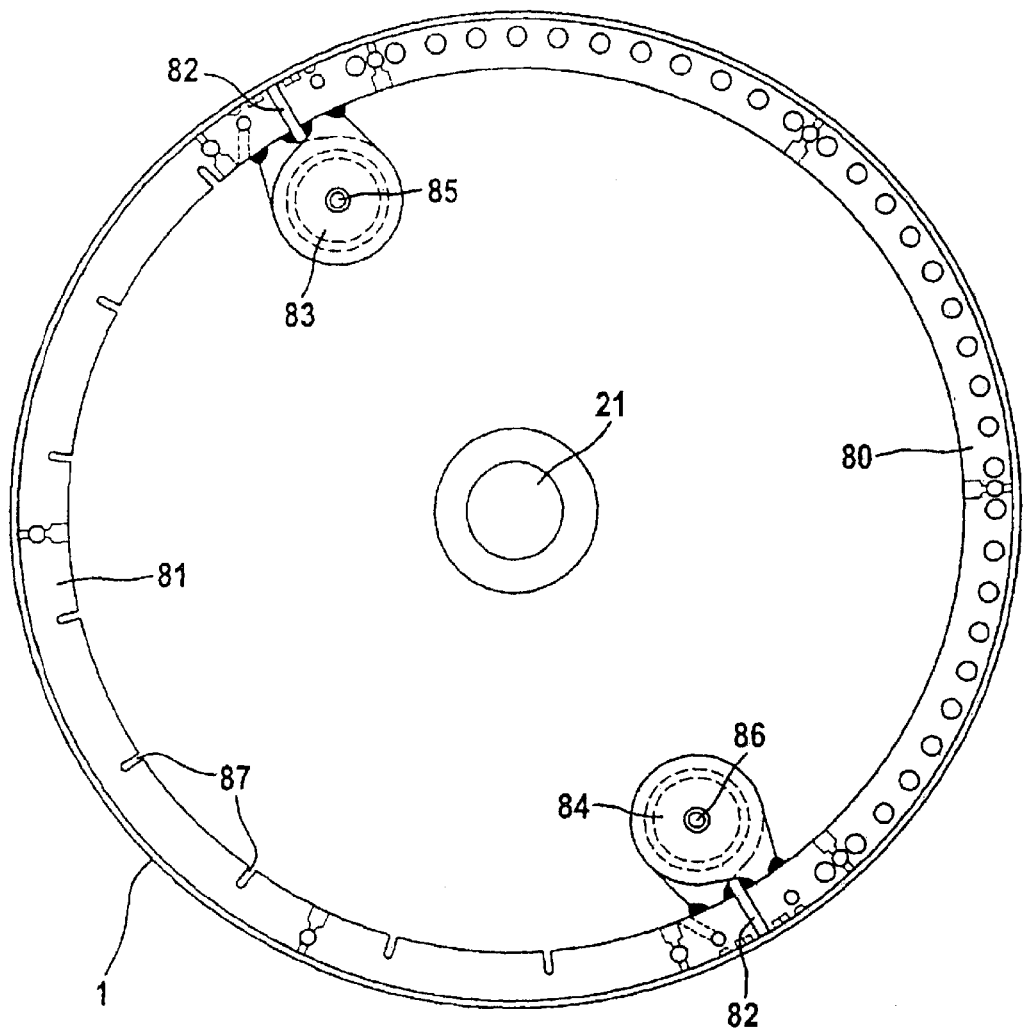
FIG. 7 shows the supporting body of an alternative embodiment.

FIG. 7 shows an axial view of an alternative design of the supporting body. This comprises two half-cylinder shells 80 and 81 which are separated by slots 82. They are connected by means of joints 83 and 84 resembling piano hinges. The two half-shells 80, 81 are not connected directly to the flanges 14, 15. Instead, the joint axes 85, 86 of their joints 83, 84 are fastened with their two ends in the flanges. One of the two joint axes, preferably that which is nearest to the calendar roller 7, is connected rigidly to the flanges. The other hinge axis 86 is guided therein in such a way that it can move only radially, but not in a circumferential direction. The half-shells 80, 81 are thereby secured unequivocally with respect to the flanges in geometric terms in any thermal state. Owing to the radial mobility of the joint axis 86 with respect to the flanges, said half-shells also have the possibility of expansion.

Since it must be expected that the two half-shells expand differently because of their different temperature, care is taken in this embodiment to ensure that the half-shell 81 which is assigned to the cooling segment can flex correspondingly in order to adapt to the state of the other half-shell 80. In order to ensure this flexibility, the half-shell 81 is provided at certain uniform intervals with slots 87 which lead from inside toward the middle of the half-shell and have a depth in the radial direction such that the desired flexibility of the half-shell 81 is achieved, without the latter losing its stable cohesion and its unequivocal supporting action with respect to the drum 1 mounted on it.

In this exemplary embodiment, the joints 83, 84 serve both for the articulated connection of the half-shells and for the support of the latter on the flanges. These two functions may be allocated to different members. For example, the two half-shells may be firmly connected to the two flanges radially and in the circumferential direction at another location (in particular, in each case in their middle) and at their free ends be joined to one another resiliently, but continuously over the surface, in any desired way, for example, by a joint or groove and tongue or a flexible joint.

The invention claimed is:

1. An apparatus for the forming of a strip, formable at increased temperature, in a continuous run on the surface of a rotating drum which is to be heated and/or to be cooled in predetermined stationary regions characterized in that the drum is mounted on a carrier body heatable or coolable in the respective regions and at least in these regions is arranged heat-exchangeably with respect to the surface of the drum.

2. The apparatus as claimed in claim 1, characterized in that at least one device for the supply of a hot-plastic plastic extrusion in the heatable region is provided, the heatable region being followed by the coolable region.

3. The apparatus as claimed in claim 1, characterized in that the drum, at least in its regions to be heated or to be cooled, bears slidingly against the surface of the carrier body.

4. The apparatus as claimed in claim 3, characterized in that at least one device for introducing a liquid between the surface of the carrier body and the drum is provided.

5. The apparatus as claimed in claim 1, characterized in that the surfaces of the carrier body and of the drum which face one another are essentially recess-free.

6. The apparatus as claimed in claim 1, characterized in that the surface of the carrier body is equipped with devices for the hydrostatic and/or hydrodynamic mounting of the drum.

7. The apparatus as claimed in claim 1, characterized in that the circulation of heat transfer liquid is provided for the heating and/or cooling of the carrier body.

8. The apparatus as claimed in claim 1, characterized in that at least one electrical heating device is provided in that region of the carrier body which is to be heated.

9. The apparatus as claimed in claim 7, characterized in that a fluid layer is provided between the surfaces of the drum and the carrier body which face one another, said fluid layer being formed by the circulation of heat transfer liquid.

10. The apparatus as claimed in claim 4, characterized in that zones of different hydrostatic bearing pressure are delimited from one another on the surface of the carrier body by means of sealing arrangements or throttle ledges.

11. The apparatus as claimed in claim 10, characterized in that the zones of different hydrostatic bearing pressure are connected to separate ducts for liquid supply and/or discharge.

12. The apparatus as claimed in claim 1, characterized in that the drum is firmly connected at each of its two edges to a holding ring.

13. The apparatus as claimed in claim 12, characterized in that the holding rings have an extension surface fitting into the inside diameter of the drum and an abutment collar, and a plurality of tension fingers distributed over the circumference and engaging into the edge of the drum are provided.

14. The apparatus as claimed in claim 1, characterized in that the carrier body is formed by a hollow cylinder or a plurality of hollow-cylinder segments which is/are held between two flanges.

15. The apparatus as claimed in claim 14, characterized in that the carrier body is formed by a plurality of hollow-cylinder segments which are connected to one another by means of joints.

16. The apparatus as claimed in claim 15, characterized in that the joints are guided or held on the flanges.

17. The apparatus as claimed in claim 1, characterized in that the carrier body is angularly adjustable about its longitudinal axis.

18. The apparatus as claimed in claim 2, characterized in that the drum, at least in its regions to be heated or to be cooled, bears slidingly against the surface of the carrier body.

19. The apparatus as claimed in claim 2, characterized in that the surfaces of the carrier body and of the drum which face one another are essentially recess-free.

20. The apparatus as claimed in claim 3, characterized in that the surfaces of the carrier body and of the drum which face one another are essentially recess-free.

* * * * *

UNITED STATES PATENT AND TRADEMARK OFFICE
CERTIFICATE OF CORRECTION

PATENT NO. : 7,422,424 B2  Page 1 of 1
APPLICATION NO. : 10/587793
DATED : September 9, 2008
INVENTOR(S) : Kark It is certified that error appears in the above-identified patent and that said Letters Patent is hereby corrected as shown below:

On the title page item (22):

After "PCT Filed:," delete "*Apr. 18, 2004*"

and insert --*Apr. 19, 2004*--.

Signed and Sealed this

Fourth Day of November, 2008

JON W. DUDAS
*Director of the United States Patent and Trademark Office*